Dec. 27, 1949 A. H. HABERSTUMP 2,492,424
ELECTRIC HEATING ELEMENT
Filed Oct. 19, 1944 4 Sheets-Sheet 1
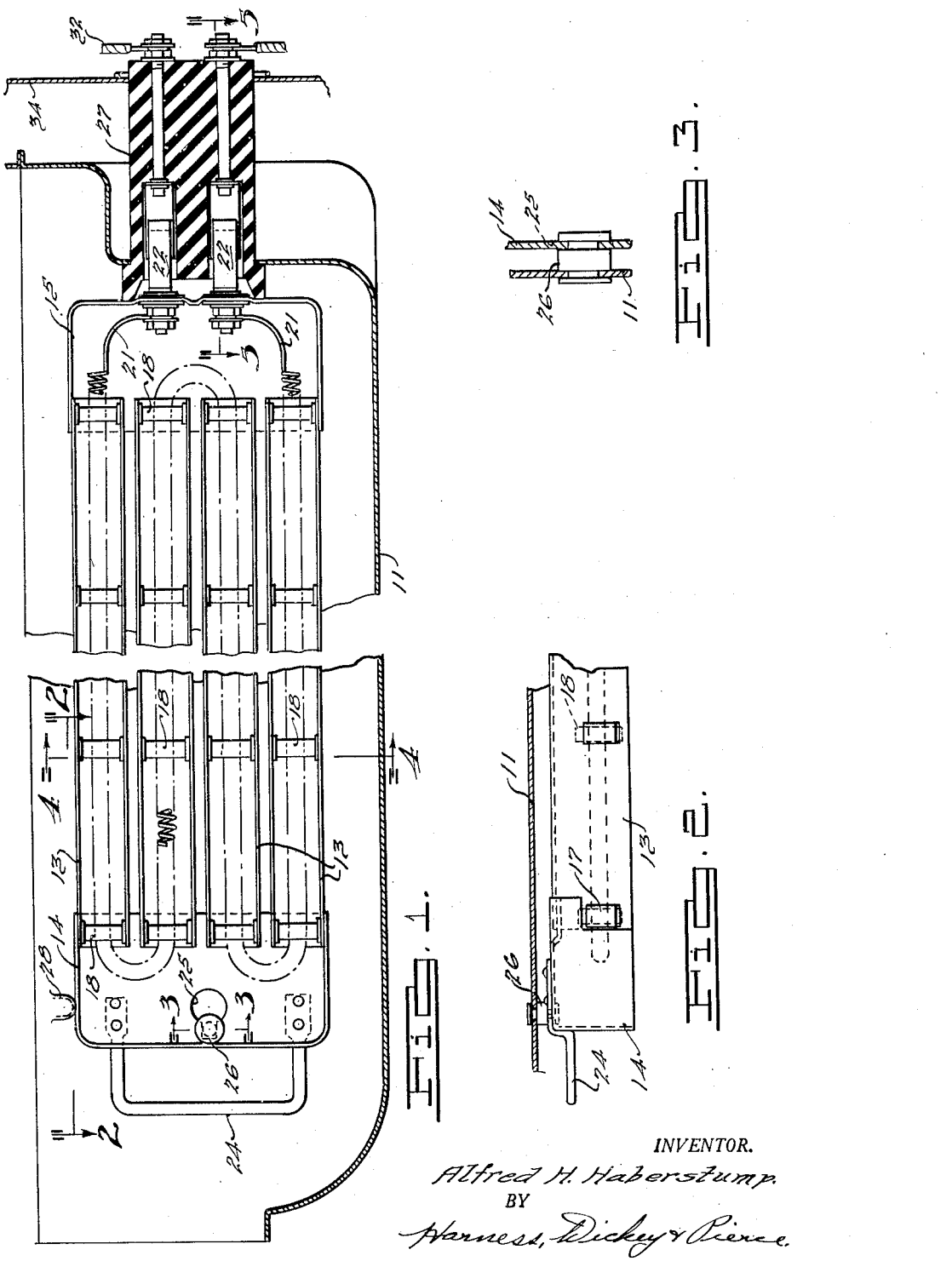
INVENTOR.
Alfred H. Haberstump.
BY
Harness, Dickey & Pierce.
ATTORNEYS.

Dec. 27, 1949 A. H. HABERSTUMP 2,492,424
ELECTRIC HEATING ELEMENT
Filed Oct. 19, 1944 4 Sheets-Sheet 2
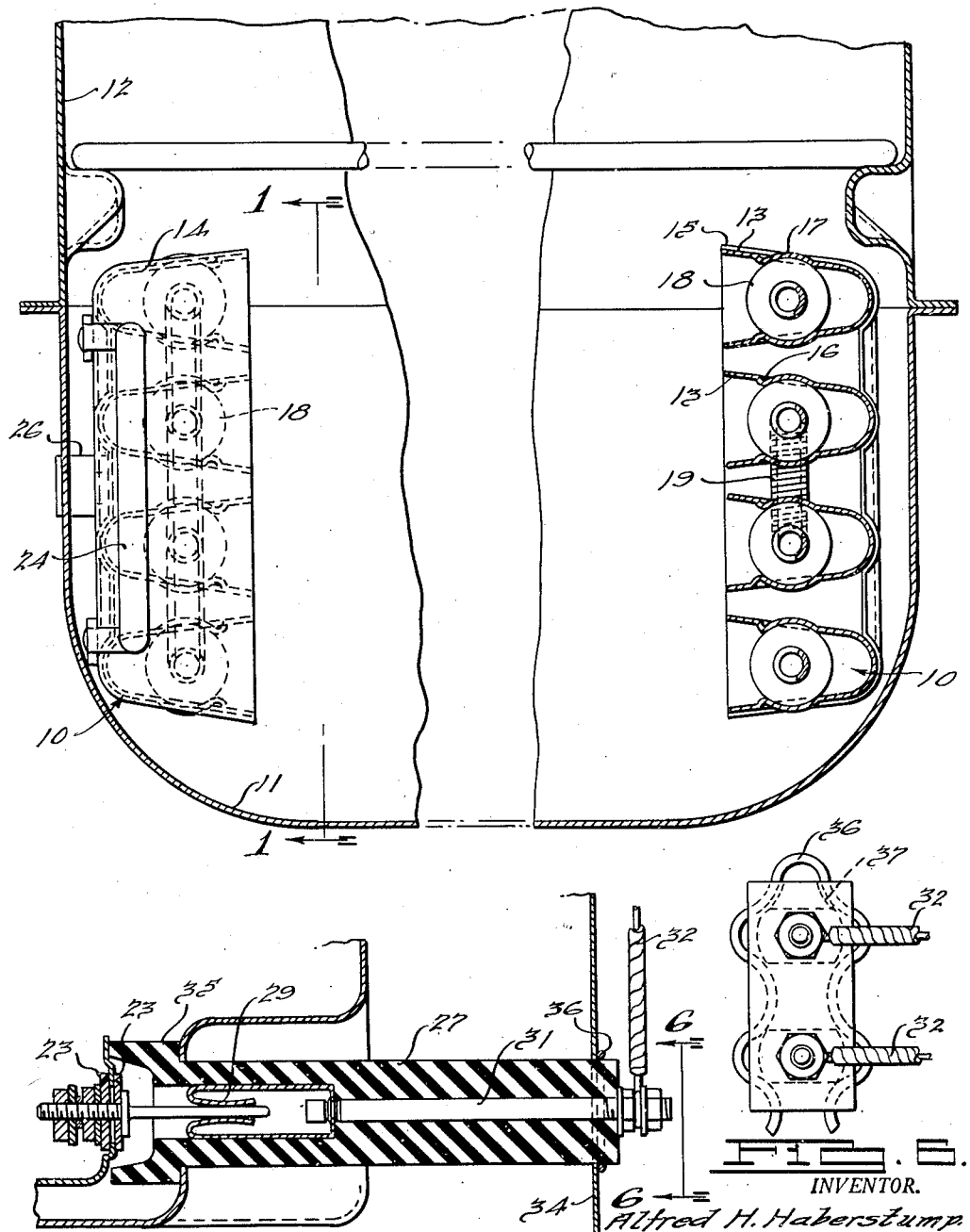
INVENTOR.
Alfred H. Haberstump
BY
Harness, Dickey & Pierce.
ATTORNEYS.

Dec. 27, 1949 A. H. HABERSTUMP 2,492,424
ELECTRIC HEATING ELEMENT
Filed Oct. 19, 1944 4 Sheets-Sheet 3
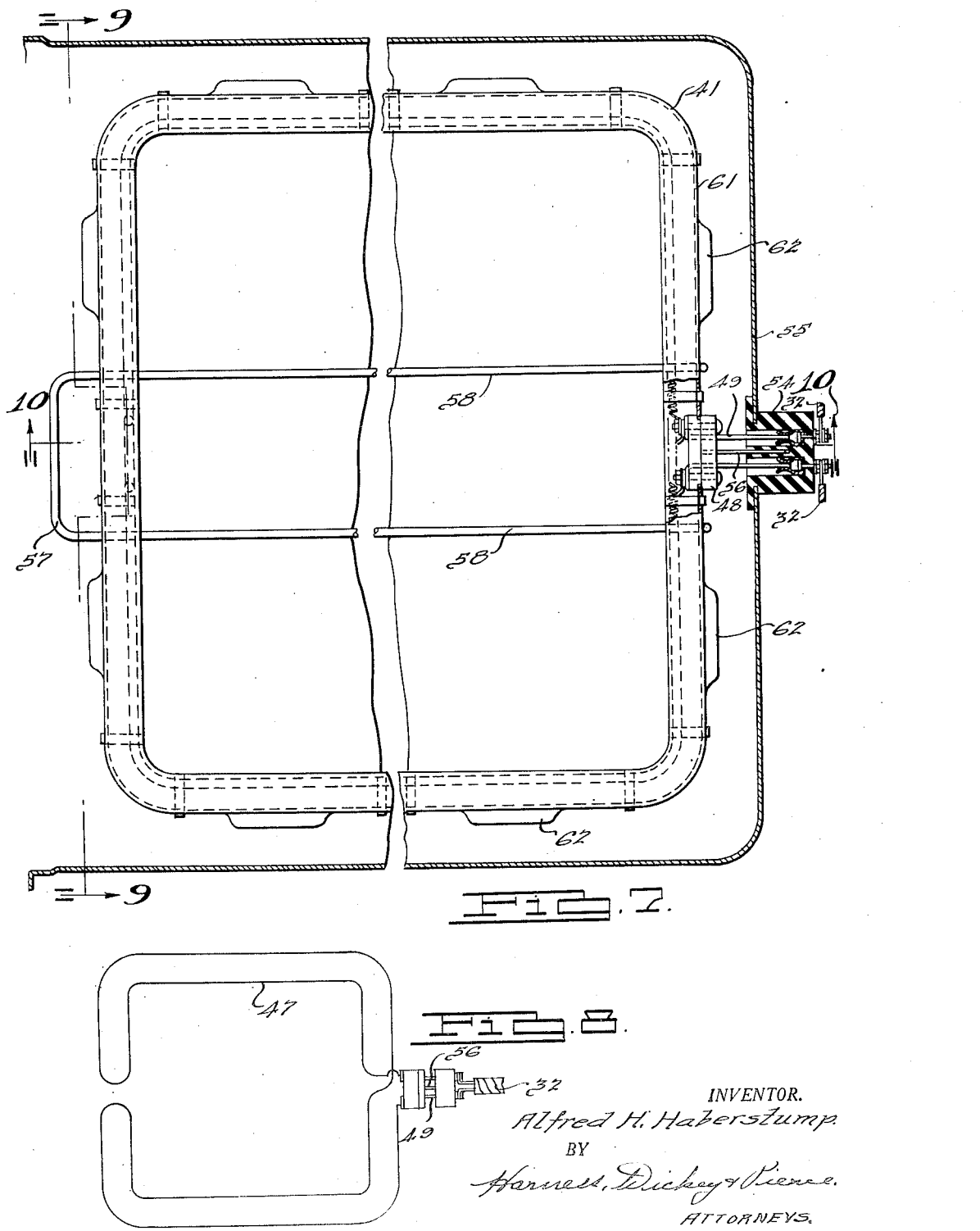
INVENTOR.
Alfred H. Haberstump.
BY
Harness, Dickey & Pierce.
ATTORNEYS.

Dec. 27, 1949 A. H. HABERSTUMP 2,492,424
ELECTRIC HEATING ELEMENT
Filed Oct. 19, 1944 4 Sheets-Sheet 4
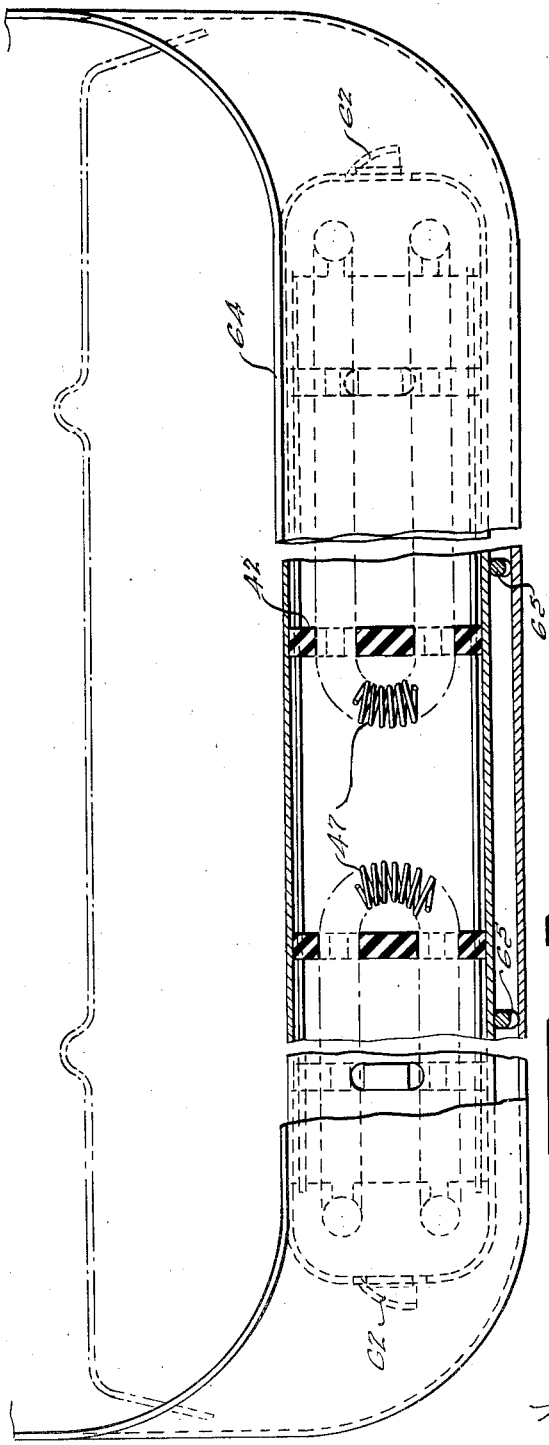
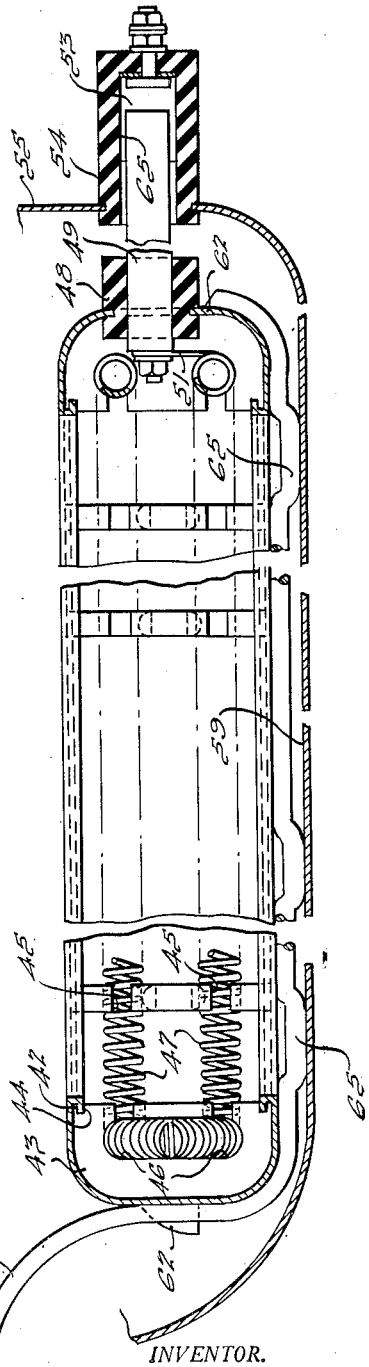
INVENTOR.
Alfred H. Haberstump.
BY
Harness, Dickey & Pierce.
ATTORNEYS.

Patented Dec. 27, 1949

2,492,424

UNITED STATES PATENT OFFICE 2,492,424

ELECTRIC HEATING ELEMENT

Alfred H. Haberstump, Detroit, Mich., assignor to The Murray Corporation of America, Detroit, Mich., a corporation of Delaware Application October 19, 1944, Serial No. 559,345

4 Claims. (Cl. 219—35)

1

This invention relates to electric heating elements, and particularly to an electric heating element of a type to be employed in an oven of a cooking stove or the like.

It has been the practice in the art to employ electric heating elements for ovens of stoves which extend across the bottom or top thereof, or both across the top and bottom of the oven chamber. While the practice of disposing the heating element in the bottom of the chamber has proved satisfactory, nevertheless it is objectionable because all of the food particles which fall from the cooking utensil or which boil thereover, fall upon the heating element or on a deflecting plate provided thereabove. The use of the deflecting plate or plates prevented a free flow of heat over all portions of the oven and, as a result, some parts of the oven were heated to a higher temperature than others.

In the construction of the present invention, the heating element may be supported either at the top or at the bottom of the oven compartment or at both the top and bottom thereof, but are so constructed as to be disposed at the sides of the compartment leaving the central portion free of the heating element to thereby eliminate the deflector plate entirely. This permits a free and desirable application and circulation of the heat produced by the respective heating elements. Frame elements may be employed which are supported directly to the sides of the oven, or a continuous frame element may be utilized which snugly engages the front, back, and side walls, leaving the central part of the oven compartment free of the heating frame. The heating coils are supported within the frame or frames, the outwardly directed top flange of which prevents any food particles or liquids from spilling upon the heating coils.

Accordingly, the main objects of the invention are: to mount the heating coils at the side of an oven compartment to produce radiant and convection heat which reaches all portions of the oven interior; to provide a frame having projecting flanges which encompasses the heating coils supported therein for protecting the coil against damage by spillage; to support a pair of heating elements on the side walls of an oven in position to be readily removed therefrom; to provide a continuous frame which is closely disposed adjacent to the front, rear, and side walls of an oven well for supporting heating coils therein leaving the central portion of the oven entirely open and free of the heating elements; and in general to provide a removable

2 heating element or elements for an oven compartment which is simple in construction and which heats the compartment at all points by radiant and convection heat flow.

Other objects and features of novelty of this invention will be specifically pointed out or will become apparent when referring, for a better understanding of the invention, to the following description taken in conjunction with the accompanying drawings, wherein Figure 1 is a broken sectional view of an oven compartment containing heating elements embodying features of this invention;

Fig. 2 is a sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is an enlarged sectional view of the structure illustrated in Fig. 1, taken on the line 4—4 thereof;

Fig. 5 is an enlarged sectional view of the structure illustrated in Fig. 1, taken on the line 5—5 thereof;

Fig. 6 is an end view of the structure illustrated in Fig. 5, as viewed from lines 6—6 thereof;

Fig. 7 is a broken plan view of an oven compartment disclosing a heating element therefor which embodies a further form of this invention;

Fig. 8 is a diagrammatic view of the electric heating coil and terminals employed in the heating element illustrated in Fig. 7;

Fig. 9 is an enlarged broken sectional view of the structure illustrated in Fig. 7, taken on the line 9—9 thereof, and Fig. 10 is an enlarged sectional view of the structure illustrated in Fig. 7, taken on the line 10—10 thereof.

Referring to Figs. 1 to 6 inclusive, a form of the invention is illustrated, that wherein heating elements 10 are supported on opposite side walls of a bottom well 11 of an oven compartment 12. Each of the heating elements is constructed from a plurality of U-shaped strips 13 which are secured to end caps 14 and 15 to form a unit construction. The side walls of the U-shaped elements are lanced at 16 to provide a web 17 therebetween which is arcuately formed, as illustrated, for receiving annular insulating washers 18 through which a heating coil 19 is threaded. The ends 21 of the coil are secured to knife blade contact terminals 22 which are supported on the end wall of the end cap 15 and insulated therefrom by the insulating washers 23, as illustrated in Fig. 5.

A bail 24 is riveted or otherwise secured to the end cap 14 in which a key-like slot 25 is provided by which the cap is secured to the headed supporting rivet 26 which is carried by the wall of the oven compartment. The opposite end of the heating element is supported by the blade terminals 22 in the terminal block 27 provided in the rear wall of the well 11. A stop element 28 is embossed in the side wall for aligning the headed rivet 26 with its slot 25. The terminal block 27 is made of insulating material and contains a pair of contact elements 29 mounted on through studs 31 to which the supply conductors 32 are attached in a conventional manner. The blade terminals 22 engage the contact elements 29, when mounted on the side of the stove, to complete the circuit to the heating coil mounted in the heating element. The rear end of the terminal block 27 projects through the rear wall 34 of the oven with a front shoulder portion 35 abutting the rear wall of the oven well. The block 27 is retained in position by a spring clip 36 of sinuous form which engages the curved bottom web of a slot 37 provided in opposite faces of the bock. The heating elements are readily mounted upon opposite side walls of the oven well by the insertion of the blade terminals into the terminal block and then securing the forward end upon the head of the rivet 26.

When current is supplied to the heating elements, the space therebetween in the oven well is radiantly heated and the heat is directed upwardly through the center of the oven to the top where it will move to the side walls and drop down to the heating elements. The air will be repeatedly heated and will move upwardly to the top of the compartment and then move outwardly and downwardly along the sides to the central open portion of the heating element. All portions of the compartment are equally and quickly heated, and any spillage which may occur will be prevented from falling upon the heating coils, drip pan or reflecting plate now being utilized. It is to be understood that while the heating units are illustrated as being applied to the side walls of the bottom well, that the same heating units may also be employed at the top of the oven alone or in combination with the bottom heating elements. It was found, however, that a better convection flow of heat was obtained when the elements were utilized at the bottom of the compartment, as illustrated.

Referring to Figs. 7 to 10 inclusive, a further form of the invention is illustrated, that wherein a continuous frame 41 is utilized which closely engages the front, rear, and both side walls of the oven compartment. The frame is U-shaped in section, as illustrated more specifically in Fig. 10, with the open face presenting inwardly and having the end flanges reversely bent to project outwardly at 42. A plurality of insulating blocks 43 have a U-shaped outer contour to mate with the inner U-shaped surface of the frame with notches 44 at the top and bottom edges. The notches receive the projecting flange 42 of the frame and stabilize the insulating blocks and prevent them from tilting after being mounted in the frame. The frame edges are sprung apart when the blocks are tilted into vertical position. The insulating block is provided with an upper and lower slot 45 which communicates with apertures 46 in which the heating coil 47 is supported.

An insulating block 48 is mounted in the rear portion of the frame for supporting the terminal blades 49 to which the ends 51 of the heating coil are attached. The heating coil 47 extends forwardly along one side of the frame across half of the front portion where it is reversed and returned to the rear portion of the frame and to the opposite side thereof to the forward frame portion and reversely moved and returned along the side portion to the opposite blade terminal 49. The coil is in series with the two blade terminals which are releasably connected to the terminals 53 of a terminal block 54 which is secured to the oven wall 55. A third terminal 56 is employed in both constructions for grounding the frame and guiding it into position in the conventional manner.

A bail 57 is secured to the under side of the frame to extend across the bottom thereof at 58 for supporting the frame from the bottom 59 of the oven. The side walls 61 of the frame are provided with a plurality of louvres 62 by which air between the frame and the oven walls may pass directly over the heating coils to thereby aid in the convection flow of the heat upwardly in the central portion of the oven and downwardly along the side walls thereof. It will be noted that the frame rests in the lower portion of the oven below the door sill 64 and that the opening 65 in the terminal block 54 is larger than the terminal blades 49 to permit the entire frame to be tilted upwardly a sufficient amount to be withdrawn over the sill 64 without straining either the blade terminals 49 or the terminal block 54.

When applying the heating element to the stove, it is only necessary to place the element upon the sill 64 and move it rearwardly as it is tilted downwardly to permit the terminal blades 49 to enter the terminal block 54, after which the front portion of the frame is lowered to have the offset portions 65 of the bail 57 rest upon the bottom 59 of the oven.

In either of the constructions herein described and illustrated, the central portion of the oven bottom is entirely free of the heating elements and a proper distribution of radiant and convection heat is provided to uniformly heat all portions of the oven. The heat passes from the side wall over the heating coils of the heating elements and is directed upwardly in the central portion of the oven compartment. After the heat reaches the top of the oven it is forced to the side of the wall where it moves downwardly to the bottom of the compartment, where it is again heated, and passed upwardly in the central portion thereof. While the heating elements, as pointed out hereinabove, are illustrated as being mounted in the bottom of the oven compartment, it is within the purview of the invention to mount the units at the top of the compartment or both at the top and bottom of the compartment, following the conventional practice.

What is claimed is:

1. In a heating element for directing heat toward the center of an oven, a plurality of spaced troughlike channel elements, end caps to which said elements are secured in spaced relation, insulating washers supported in said elements, and a coil of resistance wire supported by said washers.

2. In a heating element for directing heat toward the center of an oven, a pair of end caps, channel elements spaced apart and having their webs secured to said caps, insulating washers in said elements, and a heating coil supported by said washers in said channels with end loops disposed in said end caps.

3. In a heating element for directing heat toward the center of an oven, a pair of end caps, channel elements spaced apart and having their webs secured to said caps, insulating washers in said elements, a heating coil supported by said washers in said channel with end loops disposed in said end caps, and a terminal block on one of said end caps to which the ends of said coil are secured.

4. In a heating element for directing heat toward the center of an oven, a pair of end caps, channel elements spaced apart and having their webs secured to said caps, insulating washers in said elements, a heating coil supported by said washers in said channels with end loops disposed in said end caps, and a terminal block on one of said end caps to which the ends of said coil are secured, the opposite cap containing supporting means.

ALFRED H. HABERSTUMP.

REFERENCES CITED

The following references are of record in the file of this patent:

UNITED STATES PATENTS

| Number | Name | Date |
|---|---|---|
| 1,001,637 | Gray | Aug. 29, 1911 |
| 1,099,595 | Fischer | June 9, 1914 |
| 1,147,396 | Hawley et al. | July 20, 1915 |
| 1,244,817 | Willson | Oct. 30, 1917 |
| 1,269,052 | Clark et al. | June 11, 1918 |
| 1,389,397 | Tactikos | Aug. 30, 1921 |
| 1,426,187 | Harrison | Aug. 15, 1922 |
| 1,479,819 | Kluever | Jan. 8, 1924 |
| 1,543,692 | Biebel | June 30, 1925 |
| 1,638,452 | Panajiotaros et al. | Aug. 9, 1927 |
| 1,652,686 | Schoenfeld | Dec. 13, 1927 |
| 2,019,780 | Gough | Nov. 5, 1935 |
| 2,025,515 | Jones | Dec. 24, 1935 |

FOREIGN PATENTS

| Number | Country | Date |
|---|---|---|
| 2,120 | Austria | Sept. 10, 1900 |